United States Patent
Hamada et al.

(10) Patent No.: US 7,023,769 B2
(45) Date of Patent: Apr. 4, 2006

(54) DATA RECORDING METHOD, DATA REPRODUCTION METHOD, DATA RECORDING DEVICE, DATA REPRODUCTION DEVICE AND OPTICAL RECORDING MEDIUM

(75) Inventors: Kenichi Hamada, Kato (JP); Akira Nanba, Kato (JP); Masakazu Taguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 91 days.

(21) Appl. No.: 10/792,628

(22) Filed: Mar. 3, 2004

(65) Prior Publication Data

US 2004/0202078 A1    Oct. 14, 2004

Related U.S. Application Data

(62) Division of application No. 09/765,864, filed on Jan. 18, 2001, now Pat. No. 6,876,607.

(30) Foreign Application Priority Data

Jun. 29, 2000 (JP) .............................. 2000-196998
Nov. 15, 2000 (JP) .............................. 2000-348498

(51) Int. Cl.
*G11B 5/09* (2006.01)

(52) U.S. Cl. ................................ 369/47.17; 369/53.33
(58) Field of Classification Search .............. 369/47.17
See application file for complete search history.

(56) References Cited

U.S. PATENT DOCUMENTS

| 5,333,126 A | 7/1994 | Fukuda et al. |
| 5,557,594 A | 9/1996 | Chiba et al. |
| 5,673,243 A | 9/1997 | Yanagi et al. |
| 6,741,529 B1 * | 5/2004 | Getreuer .................. 369/30.17 |

FOREIGN PATENT DOCUMENTS

| JP | 6-096522 | 4/1994 |
| JP | 7-230672 | 8/1995 |
| JP | 8-279251 | 10/1996 |
| JP | 10-172238 | 6/1998 |

\* cited by examiner

*Primary Examiner*—Paul W. Huber
(74) *Attorney, Agent, or Firm*—Greer, Burns & Crain, Ltd.

(57) ABSTRACT

A data recording method for calculating a digital sum value (DSV) corresponding to a proportion of positive data and negative data included in predetermined data ranges, selecting a resync pattern to be inserted between the data ranges according to the DSV, and inserting the selected resync pattern between the data ranges, has a step of selecting a resync pattern that minimizes differences in DSV between the data ranges.

8 Claims, 7 Drawing Sheets

FIG.2
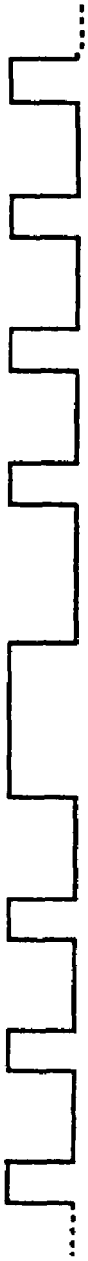
(A) DATA(1)  0010100001010001000010100001010000
(B) DOMAIN(1)
MARK LENGTH   2 + 2 + 2 + 8 + 2 + 2 + 2 = 22
SPACE LENGTH  5 + 5 + 5 + 7 + 5 + 5 + 5 = 37
DSV VALUE = 22 − 37 = −15
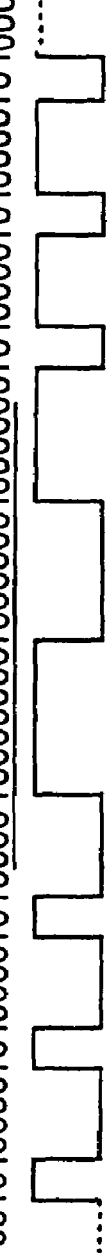
(C) DATA(2)  0010100001010001000010100001010000
(D) DOMAIN(2)
MARK LENGTH   2 + 2 + 2 + 8 + 7 + 5 + 5 = 31
SPACE LENGTH  5 + 5 + 5 + 7 + 2 + 2 + 2 = 28
DSV VALUE = 31 − 28 = 3

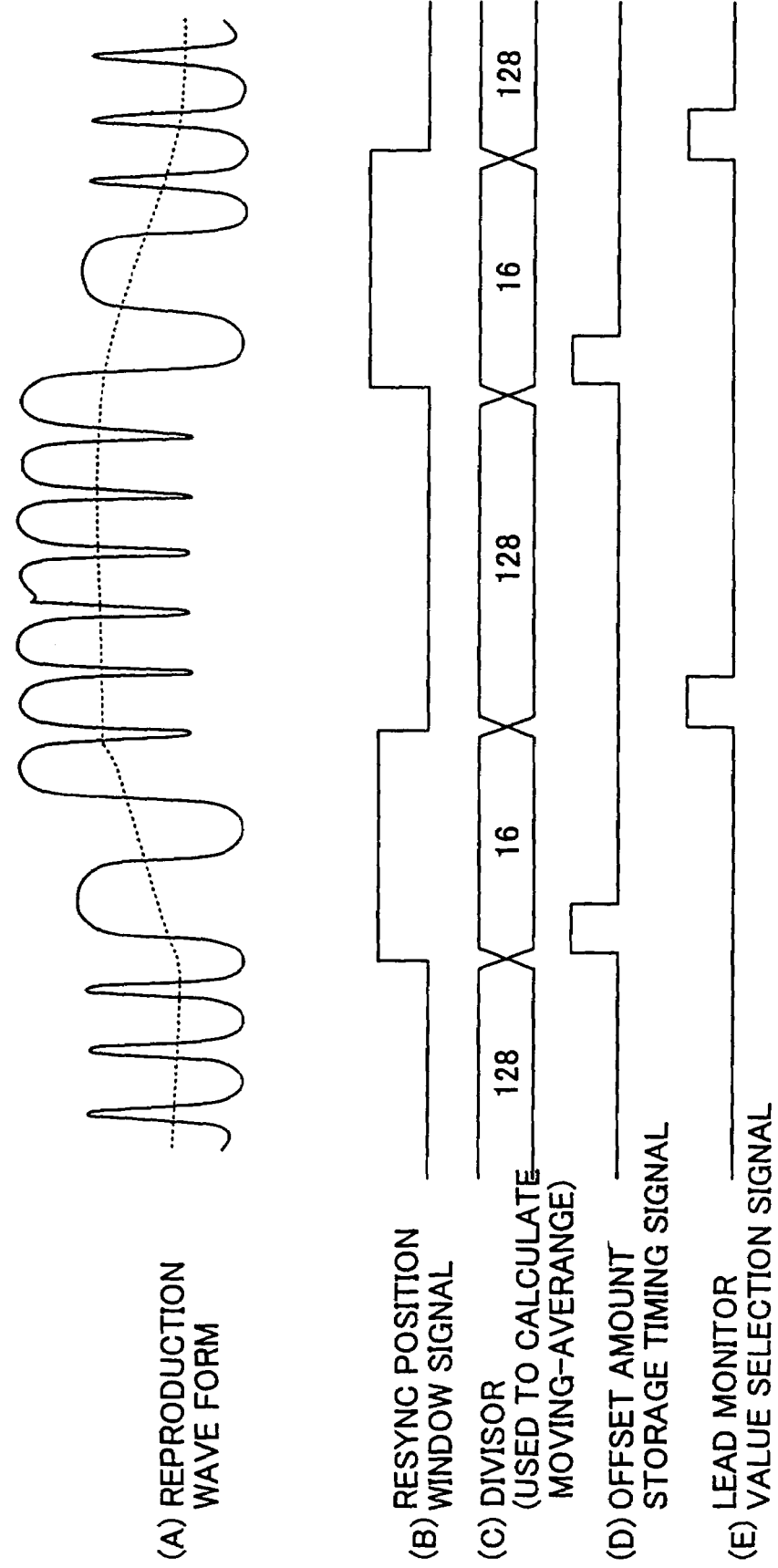

DATA RECORDING METHOD, DATA REPRODUCTION METHOD, DATA RECORDING DEVICE, DATA REPRODUCTION DEVICE AND OPTICAL RECORDING MEDIUM

This application is a divisional of U.S. application Ser. No. 09/765,864, filed Jan. 18, 2001, now U.S. Pat. No. 6,876,607.

BACKGROUND OF THE INVENTION

1. Field of the Invention

The present invention relates generally to a data recording method, data reproduction method, data recording device, data reproduction device and optical recording medium, and more particularly, to a data recording method, data reproduction method, data recording device, data reproduction device and optical recording medium adapted to high-density data recording.

2. Description of Related Art

As one type of recording method for recording data onto an optical recording medium (hereinafter optical disk), a so-called mark edge recording system is known. In the mark edge recording system, the edge portions of the marks recorded on the optical disk represent the data value. Standards for recording data on an optical disk using the mark edge recording system have been proposed (see "Data Interchange on 90 mm Optical Disk Cartridges", ISO/IEC JTC 1/SUBTRACTING CIRCUIT 23 N705, 1.23.06 Draft 2 Dec. 1994.)

However, in the mark edge recording system, when an RLL (Run Length Limited) (1,7) modulation code is recorded and the number of data logic value ones ("1"s) (hereinafter positive data) and the number of data logic value zeros ("0"s) (hereinafter negative data) differ drastically within a given sector, the average value of the direct current component of a reproduction signal from the optical disk (hereinafter DC component) is either too large or too small. In such cases, properly setting the slice level used to digitize the reproduction signal is difficult, making accurate reproduction of the data problematic.

The above-mentioned standards deal with this problem by switching as appropriate a resync pattern inserted between the data blocks, so that the accumulated sum of the DC component of the reproduction signal approaches a constant value (for example "0") and the slice level margin at time of data reproduction is increased. Specific means by which this action is accomplished is taught for example by Japanese Laid-Open Patent Application No. 8-279251.

Additionally, as a precision recording system for recording and reproducing data, the so-called PRML (partial response maximum likelihood) system is known. In the PRML system, the recording data is modulated into a partial response wave pattern and recorded onto a magneto-optical disk. The reproduction signals from that magneto-optical disk are sampled at predetermined intervals, after which data of maximum likelihood are detected by a Viterbi detector.

In the PRML system, the reproduction signal is sampled at predetermined intervals and data reproduction is carried out by detecting the transition in the level of the sampled values, so changes in the DC component of the reproduction signal degrade the potential to reproduce the data accurately. Hence the PRML system also inserts a resync pattern between the data blocks so as to minimize the DC component within a given sector when recording data to the magneto-optical disk.

Conventionally, in the PRML system, by switching the resync pattern inserted between the data blocks as appropriate, the accumulated sum of the DC component of the reproduction signal approaches a constant value (for example "0") and thus the DC component within any given sector can be held to a minimum.

Additionally, in the PRML system, when reproducing data from a magneto-optical disk, the amount by which the DC component of the reproduction wave form changes (hereinafter referred to as the offset amount) is calculated using the moving average method. By feeding the offset amount so calculated back to the expected value of the reproduction system (that is, the Viterbi decoder) the impact of the offset amount on the reproduction wave form is reduced.

However, the above-described method of minimizing the DC component within a sector by switching the resync pattern inserted between data blocks as appropriate has a disadvantage in that the DC component can change dramatically between data blocks. With the PRML system, this type of drastic fluctuation in DC component between data blocks degrades the accuracy with which data can be reproduced.

Additionally, with a Viterbi detection circuit, in which the expected value can be changed, though it is possible to calculate the sector-specific DC fluctuation component (that is, the offset) and dynamically reflect that in the expected value, the moving average method of calculating the offset amount cannot be used if the DC component fluctuates drastically between data blocks.

In particular, the method of appropriately switching the resync pattern to be inserted between the data blocks so as to minimize the DC component within a given sector sometimes causes sharp fluctuations in the DC component before and after the resync pattern located between data blocks. Such sharp fluctuations cannot be accommodated using the moving average method of calculating the offset amount.

SUMMARY OF THE INVENTION

Accordingly, it is a general object of the present invention to provide an improved and useful data recording method, data reproduction method, data recording device, data reproduction device and optical recording medium, in which the above-described disadvantages are eliminated.

Another and more specific object of the present invention is to provide an improved and useful data recording method, data reproduction method, data recording device, data reproduction device and optical recording medium in which fluctuations in the DC component between predetermined data ranges can be reduced, making it possible to accommodate changes in the DC component over predetermined data ranges and thus to improve data reproduction capability.

The above-described objects of the present invention are achieved by a data recording method for calculating a digital sum value (DSV) corresponding to a proportion of positive data and negative data included in predetermined data ranges, selecting a resync pattern to be inserted between the data ranges according to the DSV, and inserting the selected resync pattern between the data ranges, the data recording method comprising a step of selecting a resync pattern that minimizes differences in DSV between the data ranges.

According to this aspect of the invention, a DSV that corresponds to the proportion of positive data and negative data included in a predetermined data range, in other words, the DC component of that data range, is calculated. Then, a resync pattern that minimizes the difference in DSV between data ranges is selected, and that selected resync pattern is inserted between data ranges. By inserting between data ranges a resync pattern that minimizes the difference in DSV between data ranges, the fluctuation in the DC component between data ranges can be reduced and data reproduction performance can be improved.

In terms of efficiently selecting a resync pattern that minimizes the difference in DSV between data ranges, the present invention can be configured to comprise a first calculating step of calculating a first DSV of one data range, a second calculating step of calculating a second DSV over a second data range continuous with and succeeding the first data range as well as a first resync pattern, a third calculating step for calculating a third DSV of the second data range and a second resync pattern, a step of selecting either the second or the third DSV depending on which one differs less with respect to the first DSV, and a step of inserting either the first or the second resync pattern between the first and second data ranges according to whether the second or the third DSV is selected in the preceding step.

According to such a data recording method, the second DSV and the third DSV are respectively calculated when either the first resync pattern or the second resync pattern is inserted between the first data range and the second data range. Then, by selecting either the second DSV or the third DSV depending on which differs less with respect to the first DSV, a resync pattern to be inserted between the first data range and the second data range can be selected.

In terms of the ease with which a predetermined data range DSV can be changed, the present invention can be configured so that the second resync pattern inverts the positive data and the negative data included in the second data range. As a result, the second data range DSV can be changed with ease.

In terms of being able to ignore fluctuations in the DC component between data ranges if the difference between DSV between predetermined data ranges is less than a predetermined value, the present invention can be configured so that the step of selecting either the second or the third DSV depending on whichever differs least from the first DSV involves selecting either the second DSV or the third DSV whenever the difference between either the second or third DSV and the first DSV is less than a predetermined value.

According to such a data recording method, the same resync pattern selected previously can be selected and inserted between the data ranges.

Additionally, the above-described objects of the present invention are also achieved by a data reproduction method for calculating an amount of change in a DC component of a reproduction wave form, correcting an expected value in response to a moving average value of the amount of change in the DC component, and reproducing data in response to the corrected expected value, the method comprising the steps of:

calculating a present amount of change in the DC component;

calculating a moving average value of the present DC component change amount and a previous DC component change amount;

calculating a moving average value of predetermined data blocks according to a first divisor used to calculate the moving average value; and calculating a moving average value of a resync pattern portion inserted between the predetermined data blocks according to a second divisor used to calculate the moving average value that is less than the first divisor used to calculate the moving average value.

According to such a data reproduction method, the divisor used to calculate the moving average value of the present DC component change amount and the past DC component change amount can be made to differ between the predetermined data block portion and the resync pattern portion. Increasing the divisor used to calculate the moving average value causes the moving average value calculated using the moving average method to change gradually. On the other hand, decreasing the divisor causes the moving average value calculated according to the moving average method to change drastically.

Accordingly, by reducing the second divisor used to calculate the moving average value of the resync pattern portion to less than the first divisor used to calculate the moving average value of the predetermined data block portions, drastic fluctuations in the DC component between data ranges can be accommodated and data reproduction performance can be improved.

Additionally, the above-described objects of the present invention are also achieved by a data recording device for calculating a digital sum value (DSV) corresponding to a proportion of positive data and negative data included in predetermined data ranges, selecting a resync pattern to insert between the data ranges according to the DSV, and inserting the selected resync pattern between the data ranges, the data recording device comprising a unit for selecting a resync pattern that minimizes differences in DSV between the data ranges.

According to such a data recording device, DSV for a number of predetermined data ranges are calculated and a resync pattern is selected that minimizes the difference between data range DSV, and the selected resync pattern is inserted between data ranges. By inserting such a resync pattern between data ranges it is possible to limit fluctuations in the DC component between data ranges, thus improving data reproduction performance.

In terms of efficiently selecting a resync pattern that minimizes the difference in DSV between data ranges, the present invention can be configured to comprise a first calculating unit for calculating a first DSV of one data range, a second calculating unit for calculating a second DSV over a second data range continuous with and succeeding the first data range as well as a first resync pattern, a third calculating step for calculating a third DSV of the second data range and a second resync pattern, a unit for selecting either the second or the third DSV depending on which one differs less with respect to the first DSV, and a unit for inserting either the first or the second resync pattern between the first and second data ranges according to whether the second or the third DSV is selected in the preceding step.

According to such a data recording device, the second DSV and the third DSV are respectively calculated when either the first resync pattern or the second resync pattern is inserted between the first data range and the second data range. Then, by selecting either the second DSV or the third DSV depending on which differs less with respect to the first DSV, a resync pattern to be inserted between the first data range and the second data range can be selected.

In terms of the ease with which a predetermined data range DSV can be changed, the present invention can be configured so that the second resync pattern inverts the positive data and the negative data included in the second data range. As a result, the second data range DSV can be changed with ease.

In terms of being able to ignore fluctuations in the DC component between data ranges if the difference between DSV between predetermined data ranges is less than a predetermined value, the present invention can be configured so that the step of selecting either the second or the third DSV depending on whichever differs least from the first DSV involves selecting either the second DSV or the third DSV whenever the difference between either the second or third DSV and the first DSV is less than a predetermined value.

According to such a data recording method, the same resync pattern selected previously can be selected and inserted between the data ranges.

In terms of improving the expected value tracking of the data immediately following the resync pattern, the data recording device according to the present invention can be configured so as to further comprise a data range setting unit for setting the range of data for which the first, second and third DSV are calculated.

According to such a data recording device, the data range for which DSV is calculated can be set at will, so the DSV for the immediately preceding and immediately succeeding resync patterns can be calculated. As a result, the expected value tracking of the data immediately following the resync pattern can be improved.

Additionally, the above-described objects of the present invention are also achieved by a data reproduction device for calculating an amount of change in a DC component of a reproduction wave form, correcting an expected value in response to a moving average value of the amount of change in the DC component, and reproducing data in response to the corrected expected value, the device comprising:

a present DC component change amount calculating unit for calculating a present amount of change in the DC component; and a moving average value calculating unit for calculating a moving average value of the present DC component change amount and a past DC component change amount, the moving average value calculating unit for calculating a moving average value of a DC component change amount corresponding to predetermined data blocks according to a first divisor used to calculate the moving average value, the moving average value calculating unit calculating a moving average value of a resync pattern portion inserted between the predetermined data blocks according to a second divisor used to calculate the moving average value that is less than the first divisor used to calculate the moving average value.

According to such a data reproduction method, the divisor used to calculate the moving average value of the present DC component change amount and the past DC component change amount can be made to differ between the predetermined data block portion and the resync pattern portion. Accordingly, by reducing the second divisor used to calculate the moving average value of the resync pattern portion to less than the first divisor used to calculate the moving average value of the predetermined data block portions, drastic fluctuations in the DC component between data ranges can be accommodated and data reproduction performance can be improved.

Additionally, the above-described objects of the present invention are also achieved by an optical recording medium on which data is recorded, the data having a resync pattern inserted between predetermined data ranges according to a digital sum value (DSV) corresponding to a proportion of positive data and negative data included in the data ranges, the resync pattern being such as to minimize differences in DSV between the data ranges.

According to this aspect of the invention, the resync patterns that minimize differences between individual data range DSV are inserted between the data ranges. As a result, it is possible to limit fluctuations in the DC component between data ranges, thus improving data reproduction performance.

Other objects, features and advantages of the present invention will become more apparent from the following detailed description when read in conjunction with the accompanying drawings.

BRIEF DESCRIPTION OF THE DRAWINGS

FIG. 2 is a diagram illustrating an example of the DSV (digital sum value) calculation method;

FIG. 7 is a sample timing chart of the data reproduction device according to the present invention.

DETAILED DESCRIPTION OF THE PREFERRED EMBODIMENTS

A description will now be given of embodiments of the present invention, with reference to the accompanying drawings. The present invention pertains both to data recording and to data reproduction, and for convenience of explanation a description will first be given of the invention with respect to data recording.

It should be noted that identical or corresponding elements in the embodiments are given identical or corresponding reference numbers in all drawings, with detailed descriptions of such elements given once and thereafter omitted.

Figure 1:
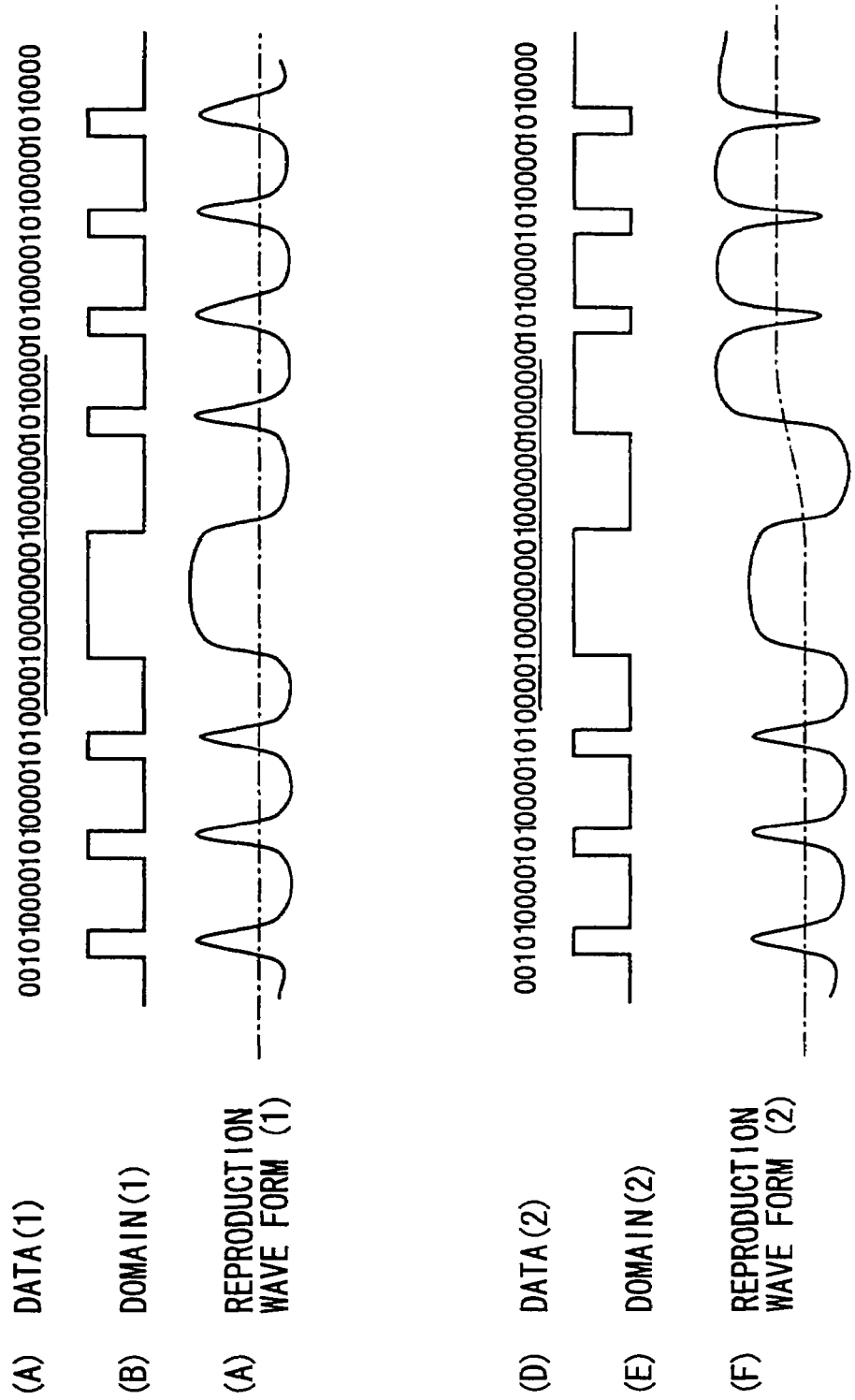
FIG. 1 is a diagram illustrating the principle on which the operation of the present invention is based.

FIG. 1 is a diagram illustrating an example of the principle on which the operation of the present invention is based.

In FIG. 1, (A) and (D) represent data 1, 2 composed of RLL (Run Length Limited) (1,7) modulated code. Data 1 has a resync pattern RSA "00010000000100000101000" (shown as an underlined portion in FIG. 1) between the data blocks. Additionally, data 2 has a resync pattern RSB "000100000001000000100000" (shown as an underlined portion in FIG. 1) between the data blocks.

The resync pattern RSA and the resync pattern RSB are two types of patterns not generated by the modulation code RLL (1,7), and are provided in order to resynchronize data when a clock slip is generated by a major defect. The resync pattern RSA and the resync pattern RSB are provided with a "0" or "1" at the fourth bit from the last so as to differ from each other. It should be noted that the data 1 and data 2 both shown in FIG. 1 differ only in their respective resync patterns RSA and RSB.

Recording the data 1 shown as (A) in FIG. 1 using the mark edge system yields the pattern domain 1 shown as (B) in FIG. 1 and the reproduction wave form 1 shown as (C) in FIG. 1. Similarly, recording the data 2 shown as (D) in FIG. 1 using the mark edge system yields the pattern domain 2 shown as (E) in FIG. 1 and the reproduction wave form 2 shown as (F) in FIG. 1. It should be noted that the term "domain" is a recording pattern recorded on an optical disk.

The data 1 and the data 2 shown in FIG. 1 as (A) and (D), respectively, differ only in their resync patterns RSA and RSB, respectively. However, it can be confirmed that the domain 1 and the domain 2 after the RSA and the RSB differ. As a result, the reproduction wave forms 1 and 2 after the resync pattern RSA and the resync pattern RSB also differ from each other.

For example, the reproduction wave form 2 shown as (F) in FIG. 1 shows a change between the DC component included in the data block before the resync pattern RSB and the DC component included in the data block after the resync pattern RSB. This change in the DC component between data blocks degrades the data reproduction performance of the PRML system.

At the same time, the reproduction wave form 1 shown as (C) in FIG. 1 shows virtually no change in the DC component included in the data block before the resync pattern RSA and the DC component included in the data block after the resync pattern RSA. If there is virtually no change in the DC component between data blocks, then the data reproduction performance of the PRML can be improved.

Hence, as described above, the present invention improves the data reproduction performance of the PRML system by selecting a resync pattern that minimizes this change in the DC component that occurs between data blocks and inserting the selected pattern between data blocks.

Next, a description will be given of the DSV calculation method used to calculate the data block DC component, with reference to FIG. 2.

FIG. 2 is a diagram illustrating an example of the DSV (digital sum value) calculation method. The DSV is calculated by subtracting the number of negative data bits, in other words the space length, from the number of positive bits, in other words the mark length.

For example, the mark length included in the domain 1 shown as (B) in FIG. 2 is 22 and the space length is 37. The mark length included in the domain 2 shown as (D) in FIG. 2 is 31 and the space length is 28. The DSV is given by the following equation using the mark length and the space length:

$$DSV = \acute{O}(\text{mark length}) - \acute{O}(\text{space length}) \quad (1)$$

From formula (1), the DSV of the domain 1 shown as (B) in FIG. 2 is −15 and the DSV of the domain 2 shown as (D) in FIG. 2 is 3. These DSV express the difference between the total number of positive data bits (the mark length) and the total number of negative data bits (the space length) in the data range selected for calculation. In other words, these DSV represent the DC component across the data range through which the DSV is calculated. Accordingly, by using the DSV calculation method described above, a DSV can be calculated that corresponds to the DC component of each data block.

The present invention involves selecting a resync pattern that minimizes changes in the DSV from one data block to a succeeding data block and inserting the selected resync pattern between the data blocks, thus reducing fluctuation in the DC component between data blocks.

Next, a description will be given of resync patterns which can be selected for insertion between data blocks, with reference to FIG. 3.

Figure 3:
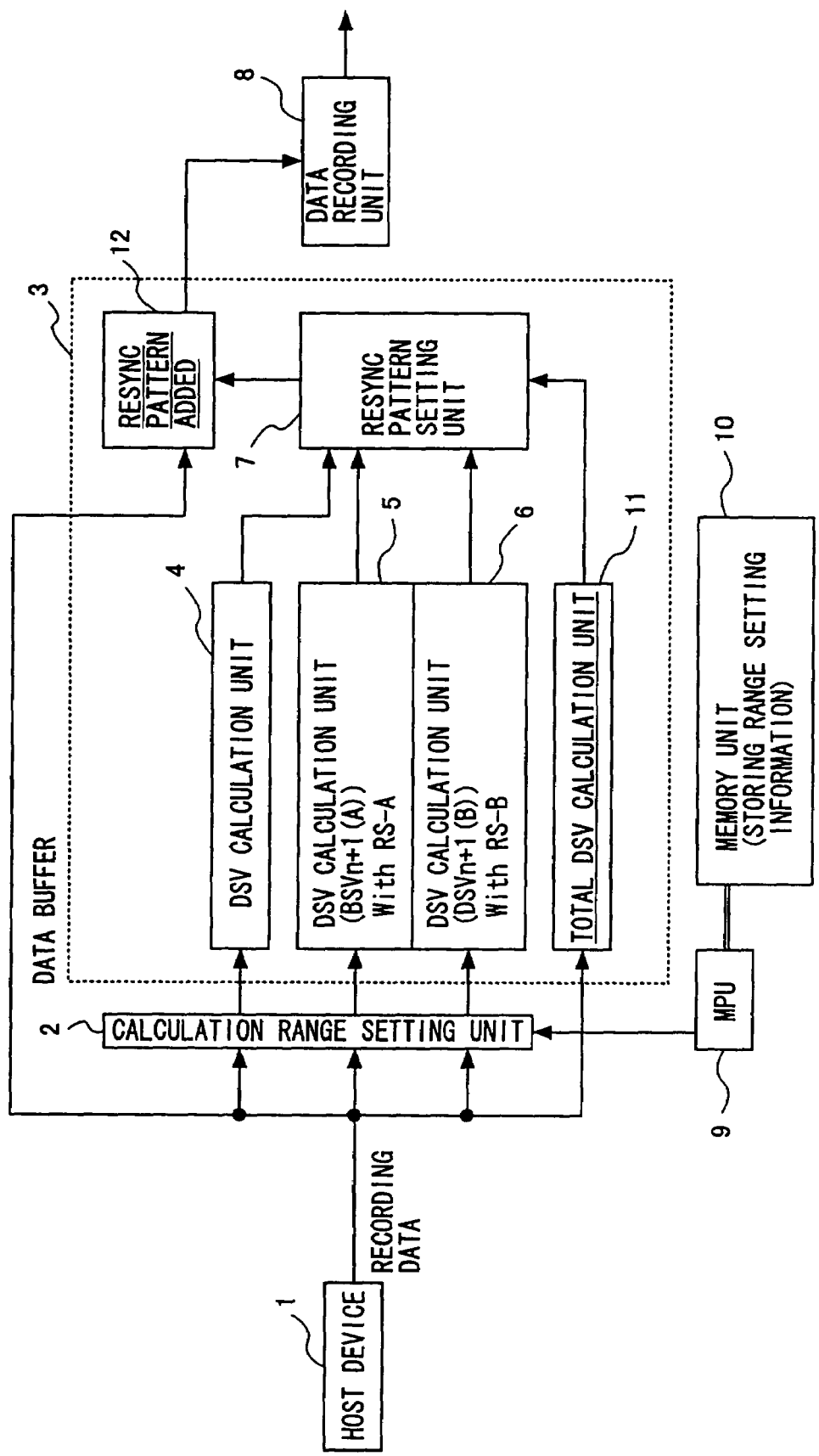
FIG. 3 is a structural diagram of a data recording device according to one embodiment of the present invention.

FIG. 3 is a structural diagram of a data recording device according to one embodiment of the present invention.

A host device 1 may for example be a personal computer or a workstation, which supplies recording data to be recorded on the optical disk to a calculation range setting unit 2. A microprocessor unit (MPU) 9 determines the data range for calculating the DSV, and adjusts the recording data output from a calculation range setting unit 2 according to the selected data range.

Figure 4:
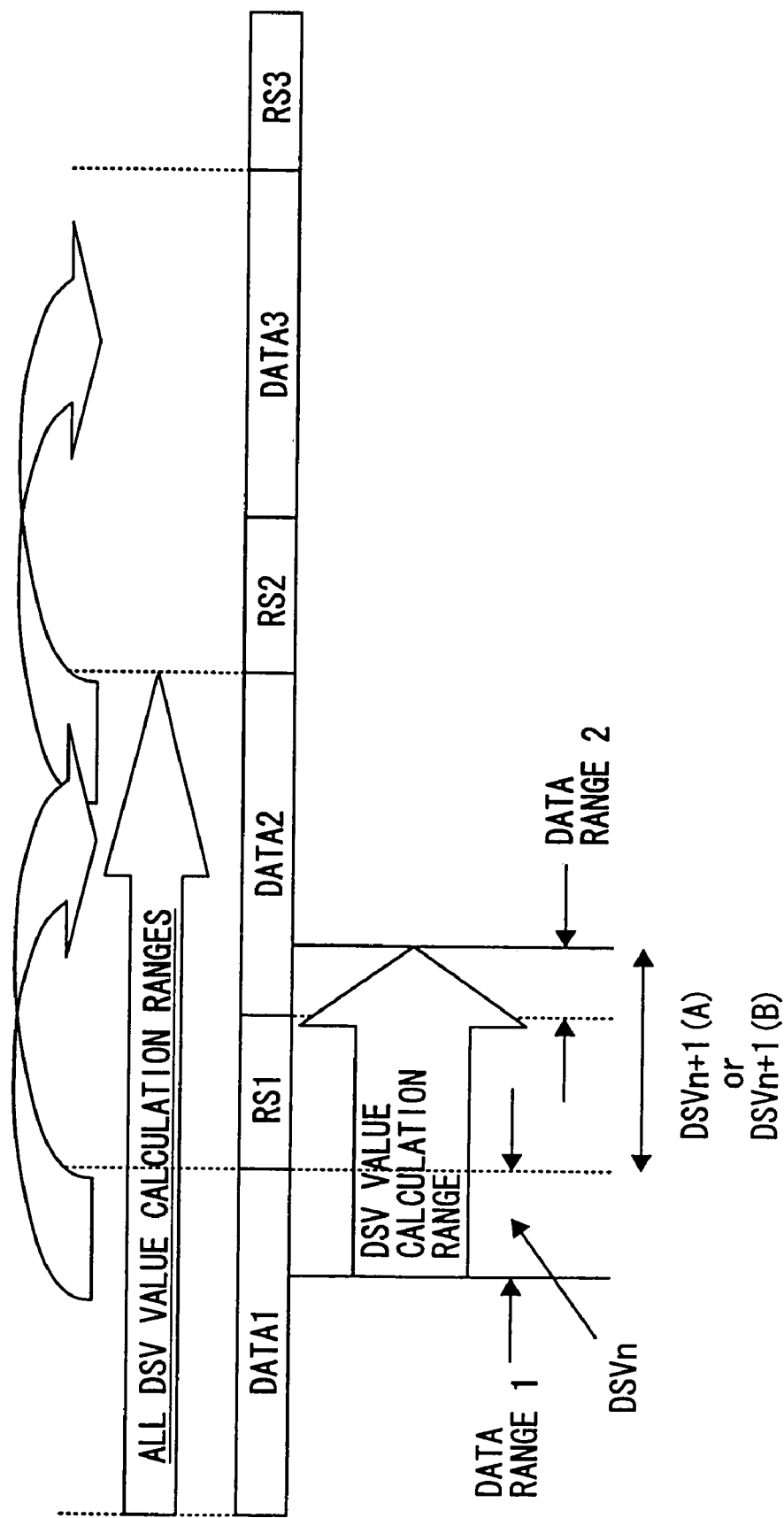
FIG. 4 is a diagram illustrating a sample DSV (digital sum value) calculation range.

FIG. 4 is a diagram illustrating a sample DSV (digital sum value) calculation range.

It should be noted that information relevant to the setting of the data range for calculating the DSV can be stored in a memory unit 10. For example, when the memory unit 10 records a DSV calculation range as shown in FIG. 4 as range setting information, the calculation range setting unit 2 supplies the recording data included in the data range 1 to a data buffer 3 DSV calculation unit 4, and at the same time supplies the recording data included in the data range 2 to the data buffer 3 DSV calculation units 5, 6. It should be noted that a total DSV calculation unit 11 is supplied with all the recording data supplied from the host device 1.

The DSV calculation unit 4 calculates a DSVn of the recording data included in the data range supplied from the calculation range setting unit 2 and supplies the calculated DSVn to a resync pattern setting unit. The DSV calculation unit 5 calculates a DSVn+1 (A) of the recording data included in the resync pattern RS-A and the data range 2 supplied from the calculation range setting unit 2, and supplies the calculated DSVn+1 (A) to the resync pattern setting unit 7.

The DSV calculation unit 6 calculates a DSVn+1 (B) of the recording data included in the resync pattern RS-B and the data range 2 supplied from the calculation range setting unit 2 and supplies the calculated DSVn+1 (B) to the resync pattern setting unit 7. The total DSV calculation unit 11 calculates a DSV of the recording data included in the entire data range as shown in FIG. 4, and supplies that DSV to the resync pattern setting unit 7.

It should be noted that the resync pattern RS-A and the resync pattern RS-B are a pattern arrangement in which the reproduction wave form of the portion following the insertion of the resync pattern RS-A and the reproduction wave form of the portion following the insertion of the resync pattern. RS-B are inverted.

The resync pattern setting unit 7 selects either the DSVn+1 (A) or the DSVn+1 (B), whichever one has the smallest difference with the DSVn. Then the resync pattern setting unit 7 determines the resync pattern to be inserted in the RS1 shown in FIG. 4 depending on the selected DSV, that is, DSVn+1 (A) or DSVn+1 (B). For example, if the difference between the DSVn+1 (A) and the DSVn is smaller than the difference between the DSVn+1 (B) and the DSVn, then the resync pattern RS-A is selected as the resync pattern to be inserted into the RS1 section.

If DSVn is "5", DSVn+1 (A) is "10" and DSVn+1 (B) is "−5", then it can be known that the difference between DSVn and DSVn+1 (A) is "−5" and the difference between DSVn and DSVn+1 (B) is "10".

In this case, the difference between DSVn and DSVn+1 (A) is less than the difference between DSVn and DSVn+1 (B), so the resync pattern RS-A is selected as the resync pattern to be inserted in the RS1 section. Accordingly, a resync pattern can be selected as appropriate so as to minimize the amount of change in the DSV before and after the RS1 portion.

Additionally, if the difference between DSVn and DSVn+1 (A) is the same as the difference between DSVn and DSVn+1 (B), then the resync pattern setting unit 7 uses the DSV from the total DSV calculation unit 11 to expand further the data range over which DSV is to be calculated, so it is still possible to select a resync pattern that minimizes the amount of change in the DSV.

It should be noted that the resync pattern setting unit 7 can also continue to select the previously selected resync pattern if the difference between DSVn and DSVn+1 (A) is the same as the difference between DSVn and DSVn+1 (B).

When the resync pattern to be inserted into the RS1 section is selected, the resync pattern setting unit 7 supplies the selected resync pattern to a resync pattern adding unit 12. The resync pattern adding unit 12 then inserts the resync pattern supplied from the resync pattern setting unit 7 into a predetermined location in the recording data supplied from the host device 1 and sends the recording data into which that resync pattern is inserted to a data recording unit 8.

Next, the data recording unit 8 processes the recording data supplied from the resync pattern adding unit 12 for recording onto an optical disk.

Accordingly, the optical recording medium on which recording data is recorded using the data recording device according to the present invention has resync patterns inserted between the data blocks that minimize the differences in DSV between data blocks. As a result, the amount of change in the DC component between data blocks decreases, providing an optical recording medium with improved data reproduction performance.

Figure 5:
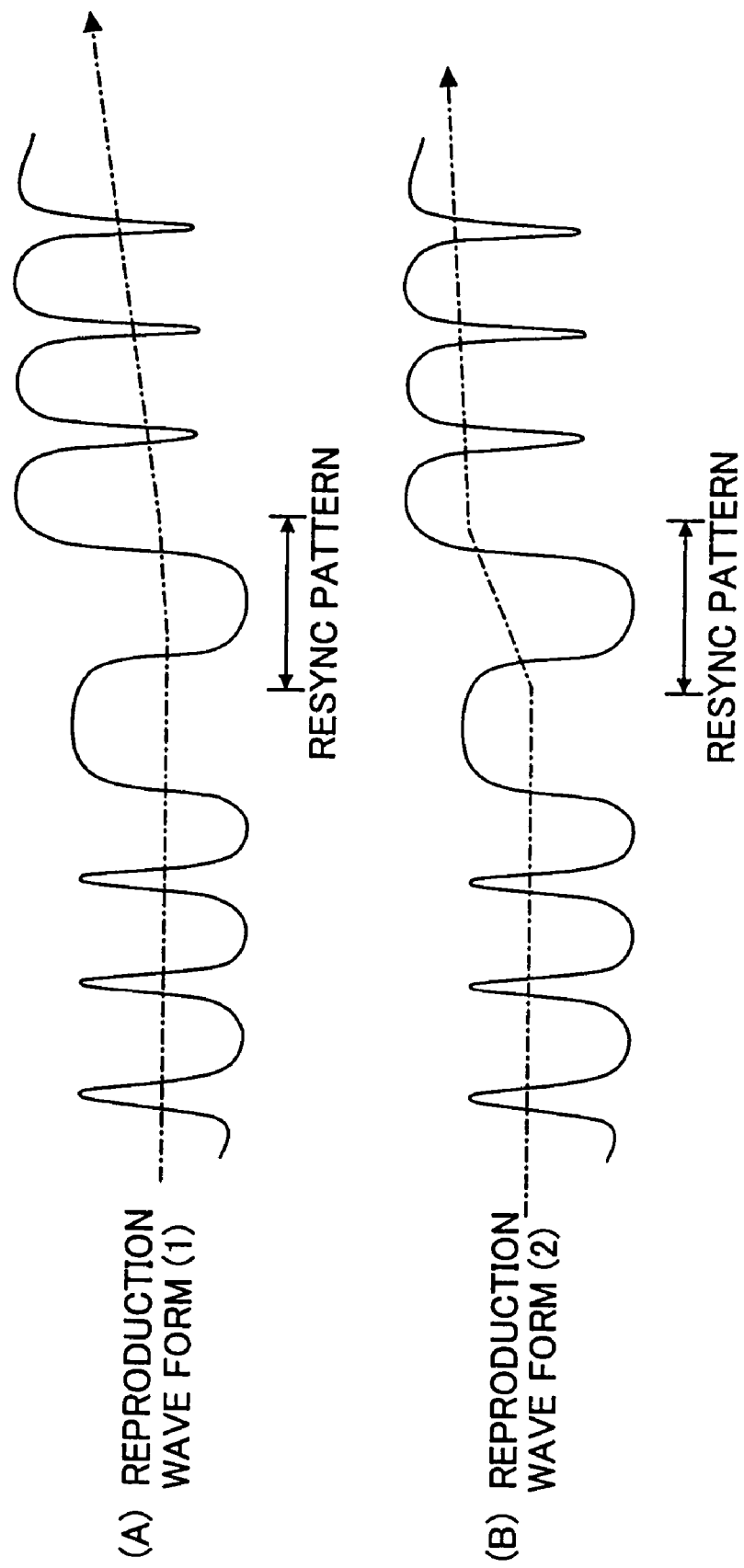
FIG. 5 is a diagram showing another example of the principle on which the operation of the present invention is based.

A description will now be given of the invention with respect to data reproduction. FIG. 5 is a diagram showing another example of the principle on which the operation of the present invention is based. The data reproduction method and data reproduction device reproduce data from an optical disk recorded with data that switches the resync pattern to be inserted between data blocks as appropriate so as to cause the total sum of the DC components of the wave forms to approximate a certain value (for example "0"), or from an optical disk recorded with data that switches the resync pattern to be inserted between data blocks as appropriate so as to minimize fluctuations in the DC component of the reproduction wave form.

FIG. 5 shows two reproduction wave forms A and B, reproduced from an optical disk. As shown in FIG. 5, the two reproduction wave forms show a change in the DC component of the data blocks that precede and succeed the resync pattern. When for example calculating the offset amount using the moving average method, an offset amount that gradually changes as shown by the broken line in A is calculated as a divisor used to calculate the moving average value is increased. An offset amount like that shown by the broken line in A cannot accommodate sharp fluctuations in DC component generated between blocks.

On the other hand, as the divisor used to calculate the moving average value is reduced the calculated offset amount becomes able to track the data pattern and the change in the offset amount increases. Accordingly, even if the calculated offset value is fed back to the expected value, because the change in the offset value is so large the expected value margin decreases.

Thus, when calculating the offset value using the moving average method, by reducing the divisor used to calculate the moving average value within the resync pattern portion an offset amount that changes sharply as shown by the broken line in B of FIG. 5 is calculated. That is, by reducing the divisor used to calculate the moving average value within the resync pattern portion below the divisor used to calculate the moving average value within the data block portion, it is possible to improve the tracking capability of the offset amount and thus improve data reproduction performance. [FMV-USER1]

Next, a description will be given of a data reproduction device capable of accommodating drastic changes in DC component generated between data blocks, with reference to FIG. 6.

Figure 6:
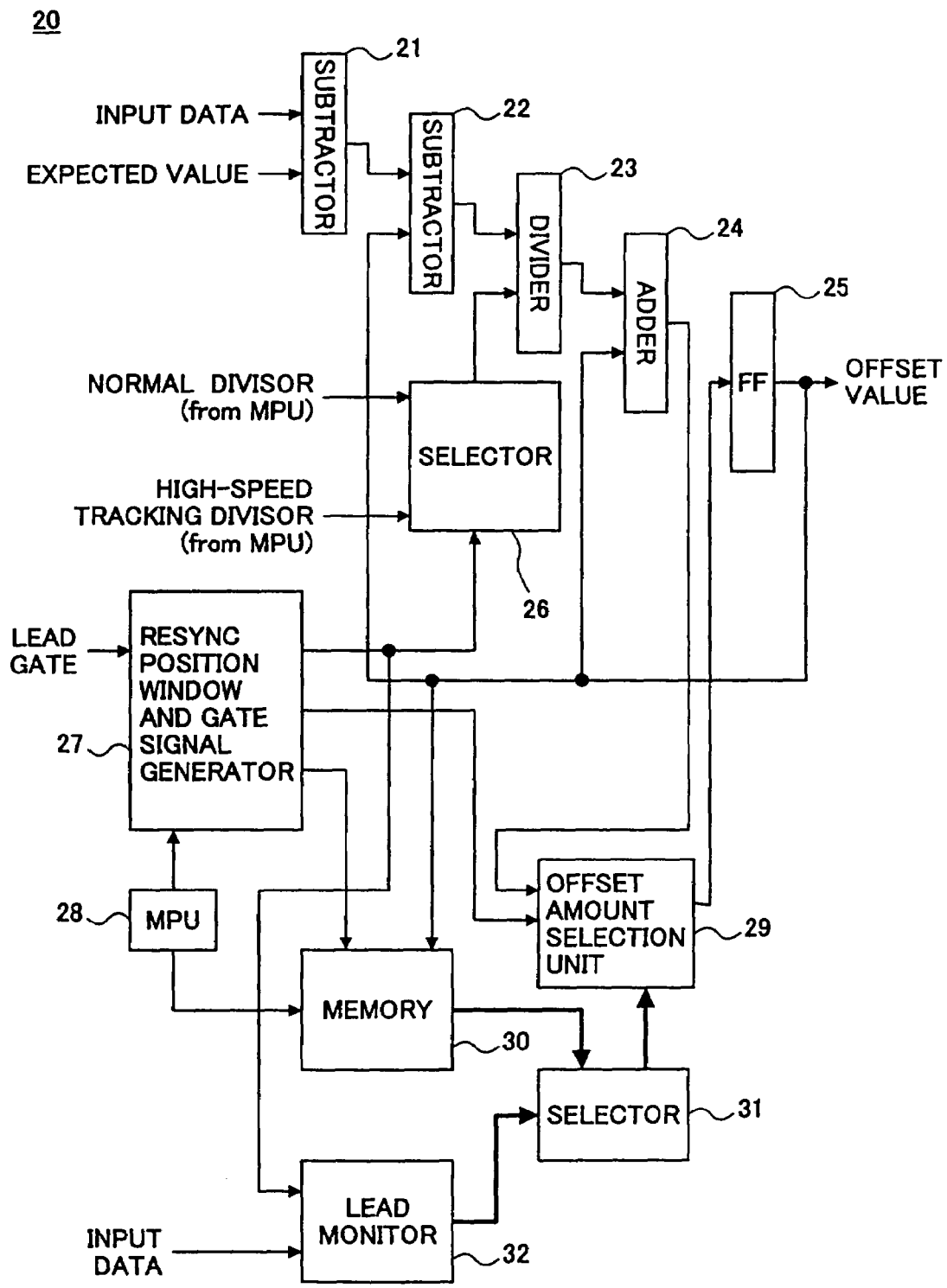
FIG. 6 is a structural diagram of a data reproduction device according to one embodiment of the present invention.

FIG. 6 is a structural diagram of a data reproduction device according to one embodiment of the present invention.

As shown in FIG. 6, a data reproduction device 20 comprises subtractors 21, 22, a divider 23, an adder 24, a flip flop (FF) 25, a selector 26, a resync position window and gate signal production unit 27, a Micro Processing Unit (MPU) 28, an offset amount selector 29, a memory unit 30, a selector 31, and a lead monitor 32.

The subtractor 21 is supplied with input data that consists of sampled values of the reproduction wave form sampled at predetermined periods as well as expected values. The subtractor calculates from the input data a differential value that is the difference of the subtracted expected value, and supplies that differential value as the present offset amount to the subtractor 22.

The subtractor 22 is supplied with the present offset amount from the subtractor 21 and at the same time is also supplied with the previous offset amount from the FF 25. The previous offset amount output from the FF 25 is fed back to the expected value of the reproduction system (the Viterbi decoding) as the offset amount.

The subtractor 22 calculates an offset amount differential value by subtracting the past offset amount from the present offset amount, and supplies that offset amount differential value to the divider 23. The offset amount differential value is a value that expresses the amount of change between the past offset amount and the present offset amount, and is a large value in those cases in which the offset amount changes drastically.

The divider 23 is supplied with both the offset amount differential value from the subtractor 22 and is also supplied from the selector 26 with the divisor used to calculate the moving average value according to the moving average method. The divider 23 divides the offset amount differential value by the number of averages supplied from the selector 26, and supplies that divided offset amount differential value to the adder 24.

The selector 26 is supplied with both the ordinary divisor used to calculate the moving average value from the MPU (for example 128) as well as the divisor used to calculate the moving average value used during high-speed tracking (for example 16), and at the same time a resync position window signal is supplied from the resync position window and gate signal production unit 27. The selector 26 supplies one or the other of either the normal divisor used to calculate the moving average value or the divisor used to calculate the moving average value at high-speed tracking to the divider 23 in accordance with the resync position window signal.

The resync position window and gate signal production unit 27 counts the lead gate signal and produces a resync position window signal. The resync position window signal is a signal for the purpose of detecting the resync pattern of the reproduction wave form, and is supplied to the selector 26. It should be noted that the lead gate signal count number can be set from the MPU 28.

A description will now be given of the relation between the resync position window signal and the divisor used to calculate the moving average value that the selector 26 supplies to the divider 23, with reference to FIG. 7.

FIG. 7 is a sample timing chart of the data reproduction device according to the present invention.

As shown in FIG. 7, A is a reproduction wave form from an optical disk, B is a resync position window signal output from the resync position window and gate signal production unit 27, C is a divisor used to calculate the moving average value which is output from the selector 26, D is an offset value storage timing signal output from the resync position window and gate signal production unit 27, and E is a lead monitor value selection signal.

The resync position window signal shown as B in FIG. 7 is at LOW level during the data block portion of the reproduction wave form A, and at HIGH level during the resync pattern portion of the reproduction wave form A. When supplied with the resync position window signal shown as B in FIG. 7, the selector 26 selects divisor 128 (the norm) when the resync position window signal is at LOW level and selects divisor 16 (for high-speed tracking) when the resync position window signal is at HIGH level, and supplies the selected divisor used to calculate the moving average value to the divider 23.

In other words, the divider 23 is supplied with a divisor of 128 in the data block section of the reproduction wave form and is supplied with a divisor of 16 in the resync pattern section of the reproduction wave form. Accordingly, the divider 23 can divide the data block section offset amount differential value by 128 (that is, the divisor normally used to calculate the moving average value) and can divide the resync pattern section offset amount differential value by 16 (that is, the divisor used during high-speed tracking to calculate the moving average value).

The adder 24 is supplied with the divided offset amount differential value from the divider 23 and is also supplied with the previous offset amount output from the FF 25. The adder 24 calculates a moving average value by adding the offset amount differential value divided by the divider 23 and the previous offset amount supplied by the FF 25, and supplies that moving average value to the offset amount selector 29.

The offset amount selector 29 is supplied with the moving average value from the Adder 24, the offset amount from the selector 31, and a lead monitor value selection signal from the resync position window and gate signal production unit 27. The offset amount selector 29 then supplies one or the other of either the offset amount supplied from the selector 31 or the moving average value supplied from the adder 24 to the FF 25 as a new offset amount in response to the lead monitor value selection signal.

The lead monitor value selection signal shown as E in FIG. 7 becomes HIGH level for a certain time period immediately after the resync pattern. When the lead monitor value selection signal is supplied to the offset amount selector 29, the offset amount selector 29 selects the offset amount supplied from the selector 31 when the lead monitor value selection signal is HIGH and selects the moving average value supplied from the adder 24 when the lead monitor value selection signal is LOW, and supplies the selected value to the FF 25 as a new offset amount.

In other words, the offset amount supplied from the selector 31 is supplied to the FF 25 only for a certain time period immediately after the resync pattern, with the moving average value supplied from the adder 24 supplied to the FF 25 as the offset amount at times other than the specific period immediately following the predetermined pattern. Then, the FF 25 latches the new offset amount supplied from the offset amount selector 29 and outputs the latched offset amount at a predetermined timing.

Next, a description will be given of the offset amount supplied to the offset amount selector 29 by the selector 31. The offset amount output from the selector 31 is selected from one or more offset amounts stored in the memory unit 30. The memory unit 30 stores an offset amount according to instructions from the MPU 28, for example. Additionally, the memory unit 30 stores offset amounts output from the FF 25 in response to the offset amount storage timing signal shown as D in FIG. 7.

The offset amount storage timing signal shown as D in FIG. 7 becomes HIGH level for a certain time period beginning immediately before the resync pattern. When supplied with the offset amount storage timing signal, the memory unit 30 stores the offset amount supplied from the FF 25 at the appearance of the leading edge of the offset amount storage timing signal. It should be noted that the memory unit 30 simplifies selection of the offset amount by rearranging as appropriate one or more offset amounts stored in the memory unit.

The selector 31 is supplied with one or more of the offset amounts stored in the memory unit 30 as well as the selection signal from the lead monitor 32. The lead monitor 32 is supplied with a resync position window signal as well as input data consisting of sampled values of the reproduction wave form sampled at predetermined time periods. The lead monitor 32 monitors a predetermined number of input data and supplies a selection signal to the selector 31 in response to the monitor results. The selector 31 selects one offset amount from among one or more offset amounts in response to the selection signal, and outputs same to the offset amount selector 29. For example the selector 31 can select an offset amount that most closely approximates the monitored predetermined number of input data.

Accordingly, the offset amount selector 29 can supply the offset amount stored in the memory unit 30 during a specific time period immediately after the resync pattern as an initial value to the FF 25.

The above description is provided in order to enable any person skilled in the art to make and use the invention and sets forth the best mode contemplated by the inventors of carrying out the invention.

The present invention is not limited to the specifically disclosed embodiments, and variations and modifications may be made without departing from the scope and spirit of the present invention.

The present application is based on Japanese Priority Application No. 2000-196998, filed on Jun. 29, 2000, and Japanese Laid-Open Patent Application No. 2000-348498, filed on Nov. 15, 2000, the contents of which are hereby incorporated by reference.

What is claimed is:

1. A data reproduction method for calculating an amount of change in a DC component of a reproduction wave form, correcting an expected value in response to a moving average value of the amount of change in the DC component, and reproducing data in response to the corrected expected value, the method comprising the steps of:

calculating a present amount of change in the DC component;

calculating a moving average value of the present DC component change amount and a previous DC component change amount;

calculating a moving average value of predetermined data blocks according to a first divisor used to calculate the moving average value; and calculating a moving average value of a resync pattern portion inserted between the predetermined data blocks according to a second divisor used to calculate the moving average value that is less than the first divisor used to calculate the moving average value.

2. The data reproduction method as claimed in claim 1, wherein the first divisor used to calculate the moving average value and the second divisor used to calculate the moving average value can be varied.

3. The data reproduction method as claimed in claim 1, wherein a width of the resync pattern can be varied.

4. The data recording method as claimed in claim 1, wherein the data reproduction method further comprises the steps of:
   storing one or more moving average values of the predetermined data blocks in a storage unit; and
   selecting one of the moving average values stored in the storage unit and setting the selected moving average value as an initial moving average value for the predetermined data blocks.

5. A data reproduction device for calculating an amount of change in a DC component of a reproduction wave form, correcting an expected value in response to a moving average value of the amount of change in the DC component, and reproducing data in response to the corrected expected value, the device comprising:
   a present DC component change amount calculating unit for calculating a present amount of change in the DC component; and
   a moving average value calculating unit for calculating a moving average value of the present DC component change amount and a past DC component change amount,
   the moving average value calculating unit calculating a moving average value of a DC component change amount corresponding to predetermined data blocks according to a first divisor used to calculate the moving average value, the moving average value calculating unit calculating a moving average value of a resync pattern portion inserted between the predetermined data blocks according to a second divisor used to calculate the moving average value that is less than the first divisor used to calculate the moving average value.

6. The data reproduction device as claimed in claim 5, wherein the first divisor used to calculate the moving average value and the second divisor used to calculate the moving average value can be varied.

7. The data reproduction device as claimed in claim 5, wherein a width of the resync pattern can be varied.

8. The data reproduction device as claimed in claim 5, wherein the data reproduction device further comprises:
   a storing unit for storing one or more moving average values of the predetermined data blocks; and
   a selecting unit for selecting one of the moving average values stored in the storing unit and setting the selected moving average value as an initial moving average value for the predetermined data blocks.

* * * * *